(12) United States Patent
Wang et al.

(10) Patent No.: US 10,715,215 B2
(45) Date of Patent: Jul. 14, 2020

(54) WIRELESS COMMUNICATION VIA A MOBILE RELAY

(71) Applicant: Google LLC, Mountain View, CA (US)

(72) Inventors: Jibing Wang, San Jose, CA (US); Erik Richard Stauffer, Sunnyvale, CA (US); Aamir Akram, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/518,054

(22) Filed: Jul. 22, 2019

(65) Prior Publication Data
US 2019/0341968 A1 Nov. 7, 2019

Related U.S. Application Data

(63) Continuation of application No. 15/939,109, filed on Mar. 28, 2018, now Pat. No. 10,419,077.

(51) Int. Cl.
| | |
|---|---|
| *H04B 7/026* | (2017.01) |
| *H04B 5/00* | (2006.01) |
| *H04W 84/18* | (2009.01) |
| *H04W 84/08* | (2009.01) |
| *H04B 1/00* | (2006.01) |
| *H04W 84/00* | (2009.01) |
| *H04W 88/04* | (2009.01) |

(52) U.S. Cl.
CPC .......... *H04B 5/0043* (2013.01); *H04W 84/18* (2013.01); *H04B 1/005* (2013.01); *H04W 84/005* (2013.01); *H04W 84/08* (2013.01); *H04W 88/04* (2013.01)

(58) Field of Classification Search
CPC .. H04B 5/0043; H94W 84/005; H04W 84/08; H04W 88/04; H04W 76/00; H04W 36/165; H04W 36/305

USPC .............................................. 455/7, 39, 13.1
See application file for complete search history.

(56) References Cited

U.S. PATENT DOCUMENTS 9,288,730 B2 * 3/2016 Al-Shalash ........... H04W 36/16
9,491,637 B2 11/2016 Hyde et al.
(Continued)

FOREIGN PATENT DOCUMENTS

| WO | 2016164808 | 10/2016 |
|---|---|---|
| WO | 2017044143 | 3/2017 |
| WO | 2019190613 | 10/2019 |

OTHER PUBLICATIONS

"First Action Interview Office Action", U.S. Appl. No. 15/939,109, dated Dec. 19, 2018, 4 pages.
(Continued)

*Primary Examiner* — Sonny Trinh
(74) *Attorney, Agent, or Firm* — Colby Nipper PLLC

(57) ABSTRACT

The present disclosure describes techniques and systems for wireless communication via a mobile relay. These techniques may include a user device that determines that a transceiver is unavailable for communicating with a base station via a wireless connection. The user device then uses a mobile relay to communicate with the base station while the transceiver is unavailable. The mobile relay may be used for transmitting or receiving data from the base station. Additionally or alternatively, the mobile relay may participate in the wireless connection as an external resource of the mobile device or may establish an independent wireless connection with the base station.

22 Claims, 9 Drawing Sheets

(56) References Cited

U.S. PATENT DOCUMENTS

| | | | |
|---|---|---|---|
| 10,051,669 B2* | 8/2018 | Ohta | H04W 36/0088 |
| 10,419,077 B1 | 9/2019 | Wang et al. | |
| 2007/0142002 A1 | 6/2007 | Rofougaran et al. | |
| 2007/0142058 A1 | 6/2007 | Matsumura et al. | |
| 2008/0107063 A1* | 5/2008 | Oleszczuk | H04W 16/10 370/315 |
| 2008/0137585 A1 | 6/2008 | Loyola et al. | |
| 2010/0113089 A1 | 5/2010 | Suzuki et al. | |
| 2010/0002656 A1 | 7/2010 | Ji et al. | |
| 2012/0039241 A1* | 2/2012 | Seo | H04B 7/15542 370/315 |
| 2012/0114050 A1* | 5/2012 | Osterling | H04B 7/024 375/259 |
| 2012/0185605 A1 | 7/2012 | Patil et al. | |
| 2012/0202562 A1 | 8/2012 | Rofougaran et al. | |
| 2013/0029589 A1 | 1/2013 | Bontu et al. | |
| 2013/0183971 A1 | 7/2013 | Tamaki et al. | |
| 2015/0029866 A1 | 1/2015 | Liao et al. | |
| 2015/0208459 A1 | 7/2015 | Kitagawa et al. | |
| 2015/0319724 A1 | 11/2015 | Chae et al. | |
| 2015/0373563 A1 | 12/2015 | Chou | |
| 2016/0029430 A1 | 1/2016 | Mishra et al. | |
| 2016/0037358 A1 | 2/2016 | Kimura | |
| 2016/0150390 A1 | 5/2016 | Chen et al. | |
| 2016/0323763 A1 | 11/2016 | Xu et al. | |
| 2017/0195054 A1 | 7/2017 | Ashrafi | |
| 2017/0223753 A1 | 8/2017 | Hoglund et al. | |
| 2017/0272186 A1 | 9/2017 | Yang et al. | |
| 2018/0027454 A1 | 1/2018 | Martin et al. | |
| 2018/0063851 A1* | 3/2018 | Abraham | H04W 16/14 |
| 2018/0092017 A1 | 3/2018 | Freda et al. | |
| 2018/0139684 A1* | 5/2018 | Aminaka | H04W 88/04 |
| 2018/0279110 A1 | 9/2018 | Sen et al. | |
| 2018/0376333 A1* | 12/2018 | Chen | H04W 12/08 |

OTHER PUBLICATIONS

"International Search Report and Written Opinion", PCT Application No. PCT/US2019/012791, dated Mar. 7, 2019, 17 pages.

"International Search Report and Written Opinion", PCT Application No. PCT/US2019/012791, dated Apr. 15, 2019, 13 pages.

"Notice of Allowance", U.S. Appl. No. 15/939,109, dated May 8, 2019, 5 pages.

"Pre-Interview Communication", U.S. Appl. No. 15/939,109, dated Oct. 31, 2018, 3 pages.

* cited by examiner

WIRELESS COMMUNICATION VIA A MOBILE RELAY

RELATED APPLICATION

This application is a continuation application of U.S. patent application Ser. No. 15/939,109, filed Mar. 28, 2018, the disclosure of which is incorporated herein by this reference.

BACKGROUND

Wireless communication has become a leading medium for accessing and uploading data. With advances in wireless protocols, which facilitate improved upload and download speeds, wireless network providers are beginning to operate over signal waves at higher frequencies. The higher-frequency signal waves have an increased capacity for communicating data over a time interval based on an increased quantity of signal waves that can be communicated with a wireless device during the time interval. However, higher-frequency wireless networks, such as a $5^{th}$ generation new radio (5G NR) wireless network, are more susceptible to fading, reflection off of an object, and signal distortion. This can lead to a decreased signal quality when compared with other wireless networks, such as a $4^{th}$ generation long-term evolution (4G LTE) wireless network. For example, when a user's hand covers an antenna of a wireless device, a signal strength of a higher-frequency signal can be dramatically reduced.

SUMMARY

This document describes techniques for, and systems that enable, wireless communication via a mobile relay. Based on a transceiver being unavailable, a user device can use the mobile relay to transmit or receive data from a base station of a wireless network. The transceiver may be unavailable based on, for example, detecting a low signal strength of a wireless connection with the base station, being occupied for another transmission or reception, a high temperature of the user device, or a low power level of the user device. When using the mobile relay for communicating with a base station, the user device may provide instructions for transmitting or receiving the data. To facilitate communication between the user device and the mobile relay, the user device may establish a wireless connection with the mobile relay that operates at a different frequency or under a different protocol than the wireless network. By using the mobile relay for communication with the base station, the user device is able to improve communication via the wireless connection. For example, communication may be improved by increasing an effective signal quality of the wireless connection, gaining access to another transceiver, or decreasing a power consumption and a heat output for transmitting the data by transmitting the data over a shorter distance.

In some aspects, a user device establishes, via a transceiver of the user device, a wireless connection with a base station. The user device determines that the transceiver is unavailable for receiving data from the base station. The user device also establishes another wireless connection with a mobile relay. For example, the other wireless connection may include a side-link connection or a personal area network connection such as Bluetooth™ or Wireless USB™. The user device transmits, to the mobile relay, a request to receive the data from the base station. The request may include instructions for receiving the data from the base station, such as an identification of communication resources over which the base station is scheduled to transmit the data. The user device then receives the data, via the mobile relay, from the base station.

In other aspects, a user device performs wireless communication via a mobile relay. The user device includes a processor, a first hardware-based transceiver, a second hardware-based transceiver, and a computer-readable storage medium storing instructions that can be executed by the processor to perform operations for wireless communication via a mobile relay. When performing the operations, the user device establishes a wireless connection with a base station via the first hardware-based transceiver. The user device then determines that the first hardware-based transceiver is unavailable for transmitting data to the base station. Before, during, or after establishing the wireless connection with the base station or determining that the first hardware-based transceiver is unavailable, the user device establishes another wireless connection with the mobile relay. The user device transmits, via the second hardware-based transceiver and over the other wireless connection, the data and instructions for transmitting the data to the base station. The instructions may include one or more of an identification of the user device, resources of the wireless connection over which the data is scheduled for transmission, or a protocol of the wireless connection.

In further aspects, a mobile relay establishes, via a first transceiver, a wireless connection with a user device. The mobile relay receives, from the user device, a request to receive data from a base station. The request includes instructions for receiving the data, such as one or more of an identification of resources over which the data is scheduled to be transmitted, a spatial layer over which the data is scheduled to be transmitted, or decoding instructions. The mobile relay establishes, via a second transceiver, another wireless connection with the base station. The mobile relay then receives the data from the base station via the other wireless connection. The mobile relay may modify the data by, for example, decoding the data, down-converting the data, or sampling in-phase and quadrature components (IQ sampling). The mobile relay then transmits, to the user device, the data from the base station, which data may have been modified by the mobile relay.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of wireless communication via a mobile relay are described below. The use of the same reference numbers in different instances in the description and the figures may indicate like elements.

DETAILED DESCRIPTION

Higher-frequency signal waves have an increased capacity for communicating data over a time interval, but are more susceptible to fading, reflection off of an object, and signal distortion. For example, a hand placed in a path of the higher-frequency signal waves has been measured to reduce a signal strength by as much as 40 decibels. Additionally, when compared with lower-frequency signal waves, higher-frequency signal waves are higher-energy signal waves, transmission of which consumes an increased amount of battery power and radiates additional heat within the user device.

This document describes techniques and systems for wireless communication via a mobile relay. These techniques may include a user device that determines that a transceiver is unavailable for communicating with a base station via a wireless connection. The user device then uses a mobile relay to communicate with the base station while the transceiver is unavailable. The mobile relay may be used for transmitting or receiving data from the base station. Additionally or alternatively, the mobile relay may participate in the wireless connection as an external resource of the mobile device or may establish an independent wireless connection with the base station.

In an illustrative example, a user device receives a downlink grant that identifies resources of a wireless connection over which the base station has scheduled for transmission of data to the user device. The user device detects that a signal quality of the wireless connection is below a threshold signal quality. This may be caused, for example, by a user's hand being placed over an antenna of the user device. In this example, the user device is wirelessly connected to a smart watch equipped with a transceiver that is usable to communicate with the base station. The user device transmits, to the smart watch, a request to receive the data from the base station. The smart watch receives the data from the base station and down-converts the data for transmitting to the user device over a different frequency than the wireless connection with the base station. For example, the smart watch transmits the down-converted data over an LTE-sidelink connection operating at a frequency below 3 GHz.

The following discussion describes an operating environment and techniques that may be employed in the operating environment and/or network environment. In the context of the present disclosure, reference is made to the operating environment or networking environment by way of example only.

Operating Environment

Figure 1:
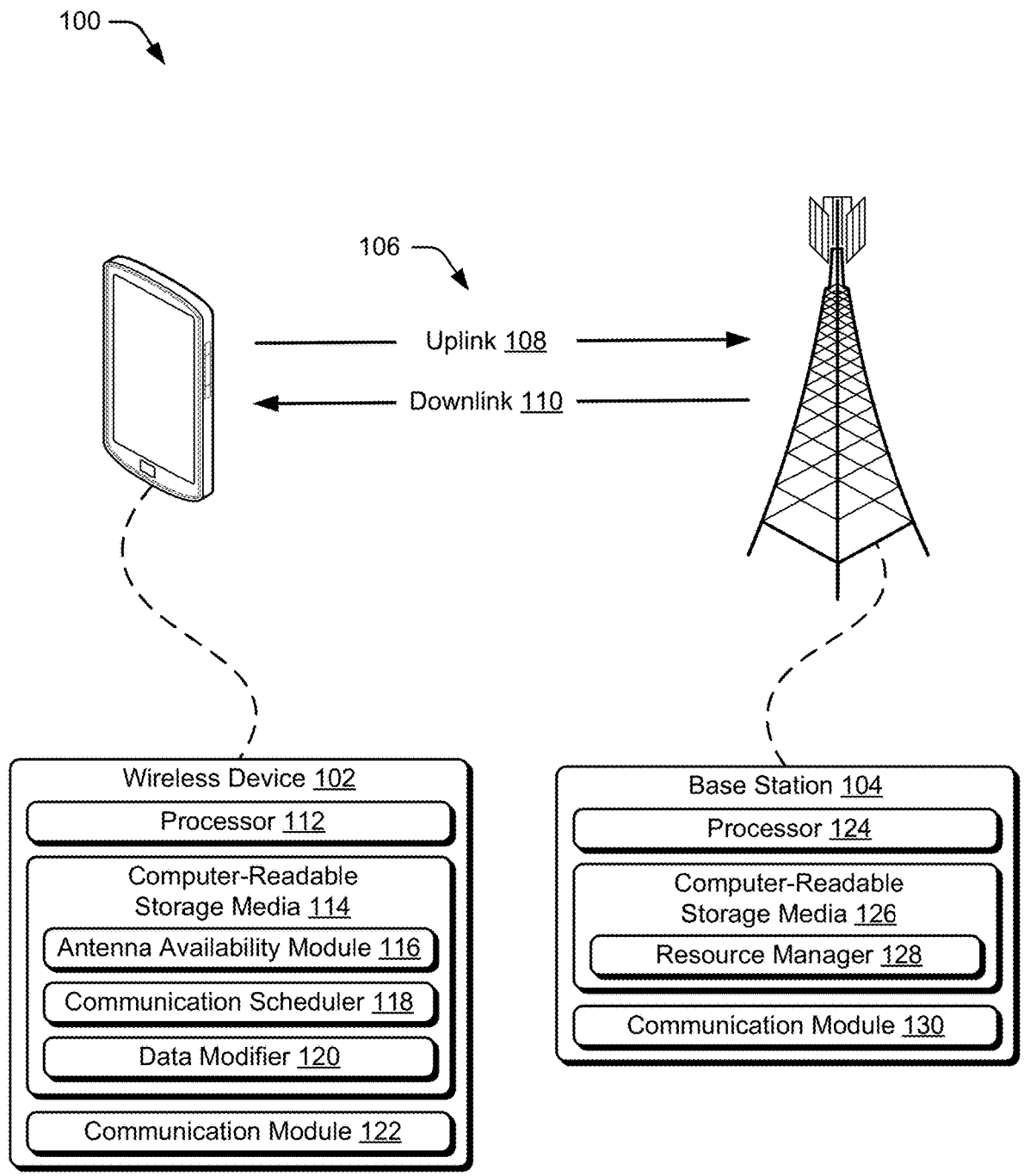
FIG. 1 illustrates example device configurations of a wireless device and a base station in accordance with one or more aspects of wireless communication via a mobile relay.

FIG. 1 illustrates an example operating environment 100 in which wireless communication via a mobile relay can be implemented. In this example, the operating environment includes a wireless device 102 and a base station 104 that are respectively configured to communicate over a wireless connection 106 of a wireless network. Generally, the wireless connection 106 includes an uplink 108 by which the wireless device 102 transmits data to the base station 104 and a downlink 110 by which the base station 104 transmits other data to the wireless device 102, such as grants for further communications. Although shown or described with reference to a separate uplink 108 or downlink 110, communication between the wireless device 102 and the base station 104 may also be referenced as a wireless association, a frame exchange, a wireless link, or a communication link.

The wireless connection 106 may be implemented in accordance with any suitable protocol or standard, such as a Global System for Mobile Communications (GSM), Worldwide Interoperability for Microwave Access (WiMax), a High Speed Packet Access (HSPA), Evolved HSPA (HSPA+) protocol, an LTE protocol, an LTE Advanced protocol, a 5G NR protocol, or a future advanced protocol. The protocol may operate based on frequency division duplexing (FDD) or time division duplexing (TDD). The wireless connection 106 may operate over a high bandwidth, such as a bandwidth greater than 1 GHz. Further, the wireless connection 106 may be configured to allow for operation at high frequencies, such as frequencies between 3 GHz and 30 GHz or between 30 GHz and 300 GHz (millimeter waves), as well as lower frequencies, such as those between 0.5 GHz and 3 GHz.

The wireless device 102 includes a processor 112; computer-readable storage media (CRM) 114 having one or more of a transceiver availability module 116, a communication scheduler 118, and a data modifier 120; and a communication module 122. The wireless device 102 is illustrated as a smart phone, however the wireless device 102 may instead be implemented as any device with wireless communication capabilities, such as a wearable smart-device, a mobile gaming console, a tablet, a laptop, an advanced driver assistance system (ADAS), a point-of-sale (POS) terminal, a health monitoring device, an unmanned aircraft, a camera, a media-streaming dongle, an internet-of-things (IoT) device, a personal media device, a navigation device, a mobile-internet device (MID), a wireless hotspot, a femtocell, a smart vehicle, or a broadband router.

The processor 112 of the wireless device 102 can execute processor-executable instructions or code stored by the CRM 114 to cause the wireless device 102 to perform operations or implement various device functionalities. In some cases, the processor 112 is implemented as an application processor (e.g., multicore processor) or a system-on-chip with other components of the wireless device integrated therein. The CRM 114 may include any suitable type of memory media or storage media, such as read-only memory (ROM), programmable ROM (PROM), random access memory (RAM), static RAM (SRAM), or Flash memory. In the context of this discussion, the CRM 114 of the wireless device 102 is implemented as hardware-based storage media, which does not include transitory signals or carrier waves. In some cases, the CRM 114 stores one or more of firmware, an operating system, or applications of the wireless device 102 as instructions, code, or information. The instructions or code can be executed by the processor 112 to implement various functionalities of the wireless device 102, such as those related to network access or audio encoding features. In this example, the CRM 114 also stores processor-executable code or instructions for implementing one or more of the transceiver availability module 116, the communication scheduler 118, or the data modifier 120 of the wireless device 102.

In some aspects, the transceiver availability module 116 determines whether a transceiver of the communication module 122 is available for communicating with the base station 104 over the wireless connection 106. The transceiver availability module 116 may determine that a transceiver is unavailable based on one or more of a signal strength of the wireless connection 106 being below a threshold signal strength, another scheduled transmission by the transceiver causing a conflict, a temperature of the wireless device 102 exceeding a temperature threshold, a power level of the wireless device 102 being below a power threshold, a conflicting procedure within the wireless device 102 operating at an interfering frequency, or a malfunction of the transceiver. A signal strength of the wireless connection 106 may be below a threshold signal strength based on an object obstructing a signal from the base station 104. In some implementations, the transceiver availability module 116 determines that all antennas of the transceiver or all transceivers of the wireless device 102 are unavailable for communicating with the base station 104.

The communication scheduler 118 determines how to utilize another wireless device for wireless communication via a mobile relay. For example, the communication scheduler 118 may determine that data should be transmitted to a mobile relay for transmission to the base station 104. The communication scheduler 118 determines which data should be transmitted to the mobile relay and what instructions, if any, to provide to the mobile relay for transmitting the data to the base station 104. For example, the instructions may identify resources over which the base station 104 has scheduled for the wireless device 102 to transmit the data. Additionally or alternatively, the instructions may identify the wireless device 102 as a source of the data.

The communication scheduler 118 may also be used to schedule receptions of data by the mobile relay. The communication scheduler 118 may transmit a request to receive data from the base station 104 and may also transmit instructions for receiving the data. For example, the request may identify resources over which the base station 104 has scheduled for transmission of data to the wireless device 102. The instructions may further include one or more of a demodulation scheme, a schedule for transmitting the data from the mobile relay to the wireless device 102, or a request to modify the data via, for example, decoding the data, partially decoding the data, or down-converting the data.

The data modifier 120 can be used to modify data from one device before transmitting to another device. For example, if the wireless device 102 is a mobile relay, the wireless device 102 may receive a request to modify the data. The wireless device 102 may decode, partially decode, or down-convert the data. If decoding the data, the wireless device 102 processes and may reformat the data to reduce an amount of decoding to be performed by a receiving user device. If partially decoding, the wireless device 102 may perform some processing of the data such as IQ sampling to reduce an amount of decoding to be performed by the receiving user device. If down-converting, the wireless device 102 converts the data from a configuration for being carried over signals transmitted by the base station 104 at a relatively high frequency bandwidth to signals at a relatively low frequency bandwidth for transmission to the receiving user device. For example, the wireless device 102 receives the data from the base station 104 on signals at frequencies over 3 GHz and converts the data to be forwarded to the receiving user device over an LTE side-link connection on signals under 2 GHz.

The wireless device 102 uses the communication module 122 to communicate with the base station 104 and another wireless device. The communication module 122 of the wireless device 102 includes at least one hardware-based transceiver and associated circuitry or other components for communicating with the base station 104 via a wireless medium. At least one of the hardware-based transceivers includes one or more antennas. For example, the communication module 122 may transmit, via a first transmitter of the transceiver, data to the base station 104 via one or more channels of the uplink 108. The data transmitted to the base station 104 may include any suitable type of framed or packetized information, such as a device location, a sounding reference signal (SRS), a physical random access channel (PRACH) communication, device status information, wireless connection status information, wireless connection control information, data requests, application data, or network access requests. The communication module 122 may also receive, via a first receiver of the transceiver, other data from the base station 104, such as application data, downlink pilots, primary or secondary synchronization signals (PSSs or SSSs), a master information block (MIB), a system information block (SIB), a downlink grant, an uplink grant, wireless connection configuration settings, network control information, or a communication mode selection.

The communication module 122 may also communicate, via a second transmitter and a second receiver of the transceiver or another transceiver, with another wireless device. For example, the second transmitter transmits data according to device-to-device protocol, such as a personal area network protocol or a side-link protocol with the other wireless device. This data can be transmitted at a frequency bandwidth that is different from a frequency bandwidth over which the first transmitter communicates with the base station 104.

In this example, the base station 104 is shown generally as a cellular base station of a wireless network. The base station 104 may be implemented to manage a cell of a wireless network that includes multiple other base stations that each manage another respective cell of the wireless network. As such, the base station 104 may communicate with a network management entity or others of the multiple base stations to coordinate connectivity or hand-offs of mobile stations within or across the cells of the wireless network.

The base station 104 can be configured as any suitable type of base station or network management node, such as a GSM base station, a node base (Node B) transceiver station (e.g., for UMTS), an evolved NodeB (eNB, e.g., for LTE), or a next generation Node B (gNB, e.g., for 5G NR). As such, the base station 104 may control or configure parameters of the uplink 108 or the downlink 110 in accordance with one or more of the wireless standards or protocols described herein.

The base station 104 includes a processor 124, a computer-readable storage media (CRM) 126 having a resource manager 128, and a communication module 130. The processor 124 can execute processor-executable instructions or code stored by the CRM 126 to perform operations or implement various base station functionalities. In some cases, the processor 124 is implemented as multiple processor cores or a multicore processor configured to execute firmware or an operating system of the base station 104. The CRM 126 may include any suitable type of memory media or storage media, such as ROM, PROM, RAM, SRAM, or Flash memory. In the context of this discussion, the CRM 126 is implemented as hardware-based storage media, which does not include transitory signals or carrier waves. The CRM 126 of the base station 104 may store firmware, an operating system, or applications of the base station 104 as instructions, code, or other information. The instructions or code can be executed by the processor 124 to implement various functionalities of the base station 104, such as to manage connectivity or parameters of the wireless connection 106 with the wireless device 102. In this example, the CRM 126 also stores processor-executable code or instructions for implementing the resource manager 128 of the base station 104.

In some aspects, the resource manager 128 of the base station 104 is implemented to perform various functions associated with allocating physical access (e.g., resource blocks) or communication resources available to the base station 104. The physical access, such as an air interface of the base station 104, may be partitioned or divided into various units (e.g., frames) of one or more of bandwidth, time, symbols, or spatial layers. For example, within a framework of a 5G NR protocol, the resource manager 128 can allocate bandwidth and time intervals of access in resource blocks, each of which may be allocated in whole, or in part, to one or more channels for communicating with the wireless device 102. The resource blocks may include multiple subcarriers, each of which spans a portion of a frequency domain of the resource blocks. The subcarriers may be further divided into resource elements, or orthogonal frequency-division multiplexing (OFDM) symbols, each of which spans a portion of a time domain of the subcarriers. Consequently, a resource block includes multiple OFDM symbols that can be grouped into subcarriers with other OFDM symbols having a common frequency.

The base station 104 communicates with the wireless device 102 via the communication module 130. The communication module 130 includes a receiver, a transmitter, and associated circuitry or other components for communicating with the wireless device 102 via the wireless medium. The communication module 130 may be configured to communicate over a frequency range of the wireless medium and over multiple spatial layers. In some cases, the communication module 130 includes, or is coupled with, multiple hardware-based transceivers and antenna arrays that are configured to establish and manage wireless connections with multiple wireless devices. The base station 104 may transmit any suitable data or information to the wireless device 102 through the downlink 110, such as a schedule of allocated communication resources, downlink pilots, application data, wireless connection status information, or wireless connection control information.

Figure 2:
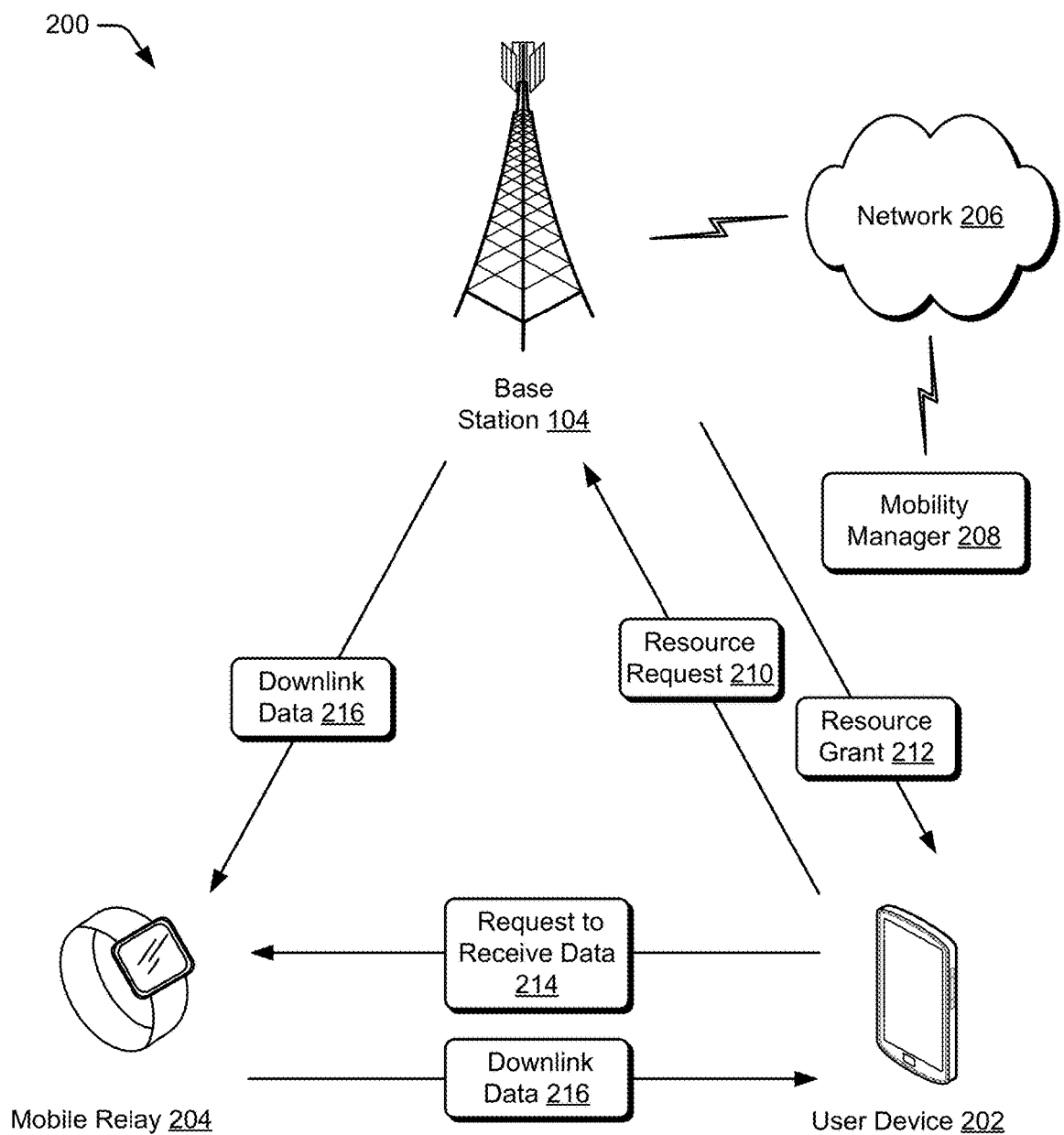
FIG. 2 illustrates an example networking environment in which a user device, a mobile relay, and a base station may communicate in accordance with one or more aspects of wireless communication via a mobile relay.

FIG. 2 illustrates an example networking environment 200 in which a user device, a mobile relay, and a base station may communicate in accordance with one or more aspects of wireless communication via a mobile relay can be implemented. The networking environment 200 includes respective instances of the wireless device 102, as a user device 202 and a mobile relay 204, and the base station 104, which provides a wireless network with which the user device 202, the mobile relay 204, and other wireless devices may associate. The mobile relay 204 may be any type of wireless device 102, such as a wearable smart-device, a smart phone, or a mobile hotspot. Further, the mobile relay 204 may include multiple devices, such as two or more of a wearable smart-device, a tablet computing device, a laptop computing device, a mobile hotspot, or a network access point for a local area network. When the mobile relay 204 includes multiple devices, the multiple devices may include additional wired or wireless connections for communicating within the mobile relay 204. Through the wireless network, the base station 104 may enable or provide access to other networks or resources, such as a network 206 (e.g., the Internet) connected via a backhaul link (e.g., fiber network). Additionally or alternatively, the networking environment 200 may include other base stations or a mobility manager 208, such as a mobility management entity (MME) or an access and mobility management function (AMF), to provide an area wide wireless network, such as a 5G NR network and associated data services.

The user device 202, the mobile relay 204, and the base station 104 may communicate through any suitable type or combination of channels, message exchanges, or network management procedures, and may operate according to communication protocols, such as those described herein. For example, the user device 202 and the base station 104 may communicate via one or more of a physical uplink control channel (PUCCH), a physical hybrid automatic repeat request (HARQ) indicator channel (PHICH), a PRACH, a physical uplink share channel (PUSCH), a physical downlink control channel (PDCCH), or a physical downlink share channel (PDSCH).

The user device 202 may request communication with the base station 104 by transmitting a resource request 210 to the base station 104. Upon receiving the resource request 210, the base station 104 determines a schedule of communication resources for one or more channels to be used to communicate with the user device 202. After determining the schedule, the base station 104 transmits a resource grant 212 to the user device 202. The resource grant 212 identifies communication resources that are allocated for receiving the downlink data 216 via the downlink 110 of the wireless connection 106. The resource grant 212 may specifically identify communication resources allocated to various channels of the wireless connection 106 for receiving data, according to the resource request 210. Although illustrated as directly communicated between the user device 202 and the base station 104, one or more of the resource request 210 or the resource grant 212 can be relayed through another device, such as the mobile relay 204.

The user device 202 may determine that a transceiver of the user device 202 is unavailable for communication with the base station 104 during the scheduled communication resources. In response to this determination, the user device 202 transmits, via a wireless connection, a request to receive data 214 to the mobile relay 204. As discussed herein, the request to receive data 214 may also include instructions for receiving the data including, for example, an identification of the scheduled communication resources, spatial layers of the scheduled communication resources, or decoding instructions for decoding the data. Based on the request to receive data 214, the mobile relay 204 configures a transceiver to receive downlink data 216, including the data, from the base station 104. The mobile relay 204 then processes the data including one or more of down-converting, partially decoding, or decoding the downlink data 216. The mobile relay 204 transmits the downlink data 216 to the user device 202 over the wireless connection with the user device 202.

The wireless connection between the user device 202 and the mobile relay 204 may include one or more of a personal area network, a Wi-Fi network, or a side-link connection. The wireless connection may operate at one or more frequencies that are different from the wireless connection 106 with the base station 104. Additionally or alternatively, one or both of the user device 202 or the mobile relay 204 may use a different transceiver for communication with each other than a transceiver used for the wireless connection 106. In some of these implementations, the transceiver used in communication between the user device 202 and the mobile relay 204 and the transceiver used for the wireless connection 106 include some common components. In other implementations, the user device 202 and the mobile relay 204 may communicate via a wired connection over a bus, such as a universal serial bus (USB) or Lightning™ bus.

In the example networking environment 200, one or more transceivers of the mobile relay 204 may function as one or more external transceivers of the user device 202. As such, the base station 104 establishes a single wireless connection 106 with what is effectively defined by the base station 104 as the wireless device 102, which includes both of the user device 202 and the mobile relay 204.

Figure 3:
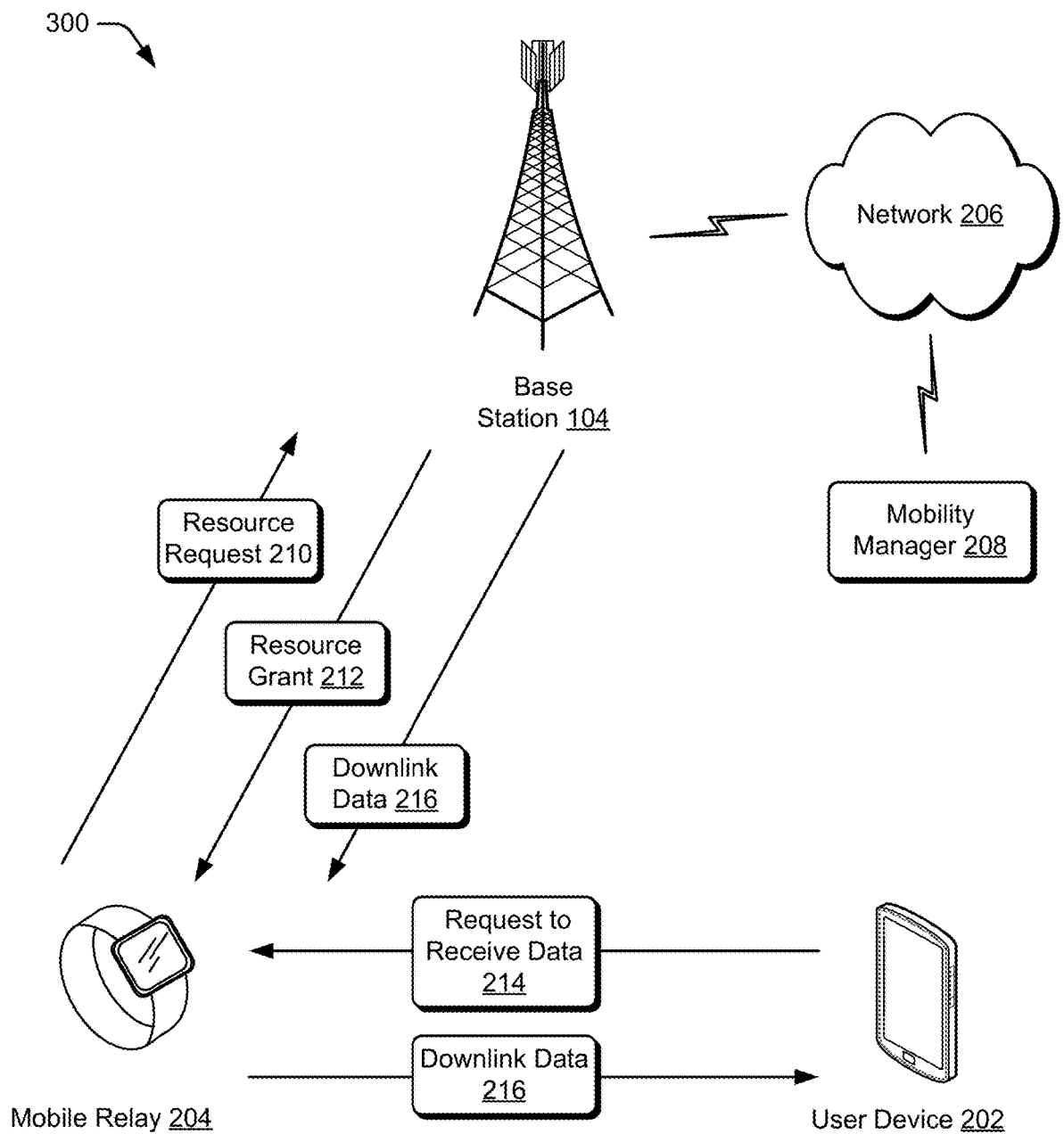
FIG. 3 illustrates another example networking environment in which the user device, the mobile relay, and the base station may communicate in accordance with one or more aspects of wireless communication via a mobile relay.

FIG. 3 illustrates another example networking environment 300 in which a user device, a mobile relay, and a base station may communicate in accordance with one or more aspects of wireless communication via a mobile relay can be implemented. The networking environment 300 includes respective instances of the wireless device 102, as the user device 202 and the mobile relay 204, and the base station 104, which provides a wireless network with which the user device 202, the mobile relay 204, and other wireless devices may associate. Through the wireless network, the base station 104 may enable or provide access to other networks or resources, such as the network 206 (e.g., the Internet) connected via a backhaul link (e.g., fiber network). Additionally or alternatively, the networking environment 200 may include other base stations or the mobility manager 208 to provide an area wide wireless network.

The user device 202 determines data to request from the base station 104 and that a transceiver of the user device 202 is unavailable for communication with the base station 104. In response to this determination, the user device 202 transmits, via a wireless connection, the request to receive data 214 to the mobile relay 204. As discussed herein, the request to receive data 214 may also include instructions for receiving the data including, for example, an identification of the scheduled communication resources, spatial layers of the scheduled communication resources, or decoding instructions for decoding the data. Based on the request to receive data 214, the mobile relay 204 transmits the resource request 210 to the base station 104 to schedule communication resources for receiving the data. The base station 104 transmits the resource grant 212 to the mobile relay 204, which is used by the mobile relay 204 to configure a transceiver for receiving the data. Upon receiving the data, the mobile relay 204 processes the data including one or more of down-converting, partially decoding, or decoding the downlink data 216. The mobile relay 204 transmits the downlink data 216 to the user device 202 over the wireless connection with the user device 202.

In the example networking environment 300, one or more transceivers of the mobile relay 204 may function as one or more external transceivers of the user device 202. As such, the base station 104 establishes a single wireless connection 106 with what is effectively defined by the base station 104 as the wireless device 102, which includes both of the user device 202 and the mobile relay 204. Alternatively, the mobile relay 204 may have a wireless connection with the base station 104 that is independent from a wireless connection between the user device 202 and the base station 104.

Figure 4:
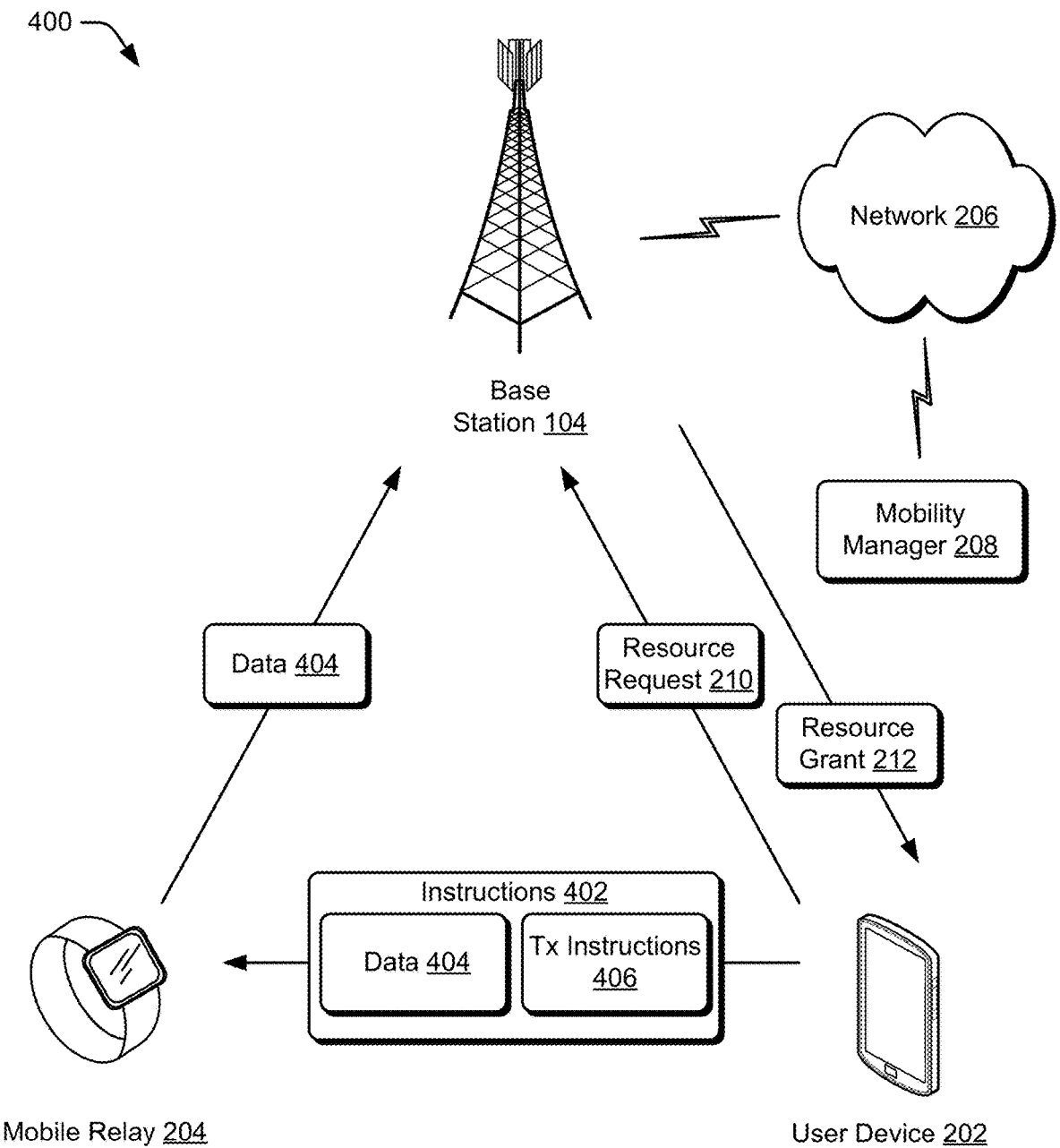
FIG. 4 illustrates another example networking environment in which the user device, the mobile relay, and the base station may communicate in accordance with one or more aspects of wireless communication via a mobile relay.

FIG. 4 illustrates another example networking environment 400 in which a user device, a mobile relay, and a base station may communicate in accordance with one or more aspects of wireless communication via a mobile relay can be implemented. The networking environment 400 includes respective instances of the wireless device 102, as the user device 202 and the mobile relay 204, and the base station 104, which provides a wireless network with which the user device 202, the mobile relay 204, and other wireless devices may associate. Through the wireless network, the base station 104 may enable or provide access to other networks or resources, such as the network 206 (e.g., the Internet) connected via a backhaul link (e.g., fiber network). Additionally or alternatively, the networking environment 200 may include other base stations or the mobility manager 208 to provide an area wide wireless network.

The user device 202 determines data to transmit to the base station 104 and transmits the resource request 210 to the base station 104. Upon receiving the resource request 210, the base station 104 determines a schedule of communication resources for one or more channels to be used to communicate with the user device 202. After determining the schedule, the base station 104 transmits the resource grant 212 to the user device 202. The resource grant 212 identifies communication resources that are allocated for transmission of the data via the uplink 108 of the wireless connection 106. Although illustrated as directly communicated between the user device 202 and the base station 104, one or more of the resource request 210 or the resource grant 212 can be relayed through another device, such as the mobile relay 204.

The user device 202 may determine that a transceiver of the user device 202 is unavailable for communication with the base station 104 during the scheduled communication resources. In response to this determination, the user device 202 transmits, via a wireless connection, instructions 402 to the mobile relay 204. The instructions 402 include data 404 for transmitting to the base station 104 and transmission (Tx) instructions 406. The transmission instructions 406 may include, for example, an identification of the scheduled communication resources, spatial layers of the scheduled communication resources, or instructions for identifying the user device 202 as a source of the data 404. The instructions may further direct the mobile relay 204 to transmit the data 404 over the identified communication resources of the wireless connection between the user device 202 and the base station 104. Based on the instructions 402, the mobile relay 204 transmits the data 404 to the base station 104. The mobile relay 204 may convert the data 404 into another format before transmitting to base station 404 according to a protocol of a wireless connection between the base station 104 and the mobile relay 204.

In the example networking environment 400, one or more transceivers of the mobile relay 204 may function as one or more external transceivers of the user device 202. As such, the base station 104 establishes a single wireless connection 106 with what is effectively defined by the base station 104 as the wireless device 102, which includes both of the user device 202 and the mobile relay 204.

Figure 5:
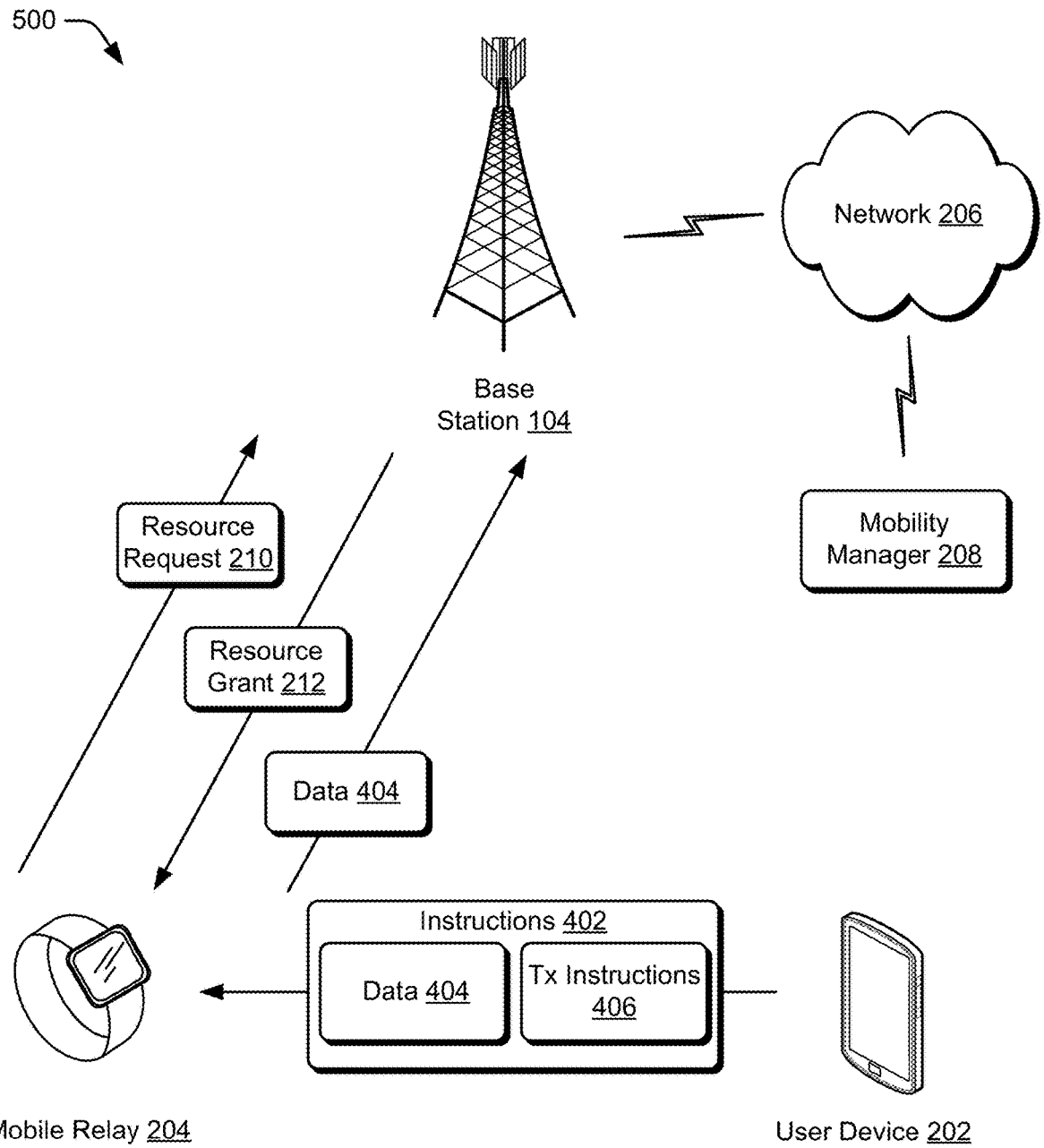
FIG. 5 illustrates another example networking environment in which the user device, the mobile relay, and the base station may communicate in accordance with one or more aspects of wireless communication via a mobile relay.

FIG. 5 illustrates another example networking environment 500 in which a user device, a mobile relay, and a base station may communicate in accordance with one or more aspects of wireless communication via a mobile relay can be implemented. The networking environment 500 includes respective instances of the wireless device 102, as the user device 202 and the mobile relay 204, and the base station 104, which provides a wireless network with which the user device 202, the mobile relay 204, and other wireless devices may associate. Through the wireless network, the base station 104 may enable or provide access to other networks or resources, such as the network 206 (e.g., the Internet) connected via a backhaul link (e.g., fiber network). Additionally or alternatively, the networking environment 200 may include other base stations or the mobility manager 208 to provide an area wide wireless network.

The user device 202 determines data to transmit to the base station 104 and that a transceiver of the user device 202 is unavailable for communication with the base station 104. In response to this determination, the user device 202 transmits, via a wireless connection, the instructions 402 to the mobile relay 204. The instructions 402 include the data 404 and may also include the transmission instructions 406, such as instructions for identifying the user device 202 as a source of the data 404.

Based on the instructions 402, the mobile relay 204 transmits the resource request 210 to the base station 104 to request an allocation of resources over which the mobile relay 204 can transmit the data 404. Upon receiving the resource request 210, the base station 104 determines a schedule of communication resources for one or more channels to be used to communicate with the mobile relay 204. After determining the schedule, the base station 104 transmits the resource grant 212 to the mobile relay 204. The resource grant 212 identifies communication resources that are allocated for transmission of the data 404 via the uplink 108 of the wireless connection 106. The mobile relay 204 then transmits, according to the resource grant 212, the data 404 to the base station 104. The mobile relay 204 may identify either the mobile relay 204 or the user device 202 as a source of the data 404 in the transmission.

In the example networking environment 500, one or more transceivers of the mobile relay 204 may function as one or more external transceivers of the user device 202. As such, the base station 104 establishes a single wireless connection 106 with what is effectively defined by the base station 104 as the wireless device 102, which includes both the user device 202 and the mobile relay 204. Alternatively, the mobile relay 204 may have a wireless connection with the base station 104 that is independent from a wireless connection between the user device 202 and the base station 104.

Figure 6:
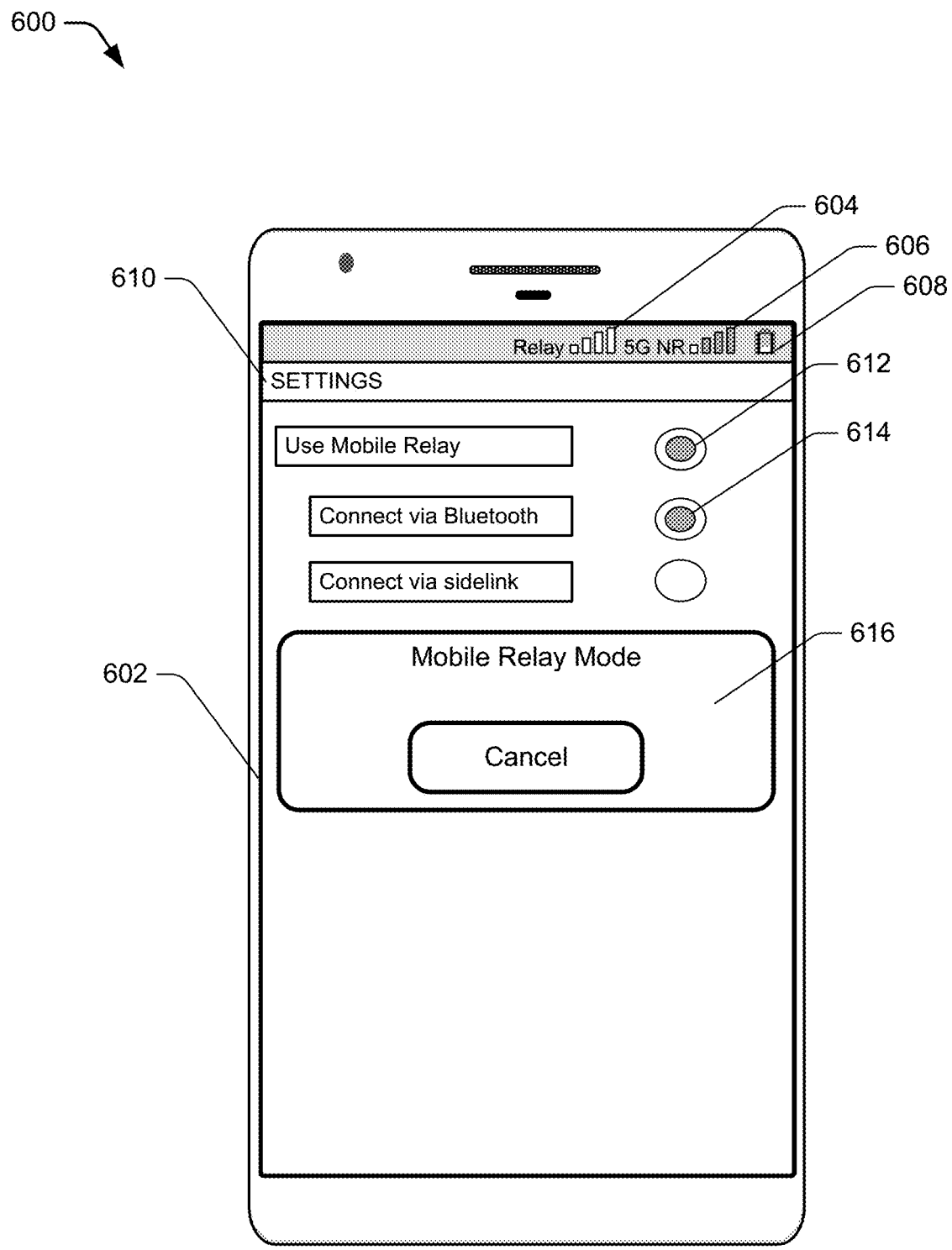
FIG. 6 illustrates an example user interface of the user device through which a user may provide input in accordance with one or more aspects of wireless communication via a mobile relay.

FIG. 6 illustrates an example user interface 600 of the wireless device 102, which may represent one or both of the user device 202 or the mobile relay 204, through which one or more aspects of wireless communication via a mobile relay can be implemented. In this example, the user interface 600 is presented through a visible portion of a display 602 for providing output to a user. The display 602 may also include, or be integrated with, a touch screen or touch-sensitive overlay for receiving touch input from the user. The display 602 may also display one or more of a signal-quality indicator 604 of a wireless connection with a relay, a signal quality indicator 606 of a wireless connection with the base station 104 (shown as 5G NR), or an power level indicator 608 of the wireless device 102. In some cases, the display 602 provides or makes accessible a settings menu 610 through which the user interface 600 can receive input 612 to use a mobile relay for communication with the base station 104. The settings menu 610 can receive a further input 614 to request one or more modes, such as a connection mode for communicating with the mobile relay 204.

Additionally or alternatively, the wireless device 102 may provide a notification 616 via the user interface 600 to indicate that the user device 202 is entering the multi-carrier mode, based on a receipt of a resource grant for additional resources. The notification 616 is illustrated in this example as a pop-up notification in the display 602, however, other forms of notification 616 may be implemented in addition or in alternative to the pop-up notification. For example, the user device 202 may provide an audible notification, a visible notification via a light emitting diode (LED) indicator that is separate from the display 602, or a motion-based notification such as a vibration of the wireless device 102.

The user interface 600 is but one of many possible user interfaces for implementing inter-RAT spectrum sharing. Although the wireless device 102 is illustrated as a smart phone with a touch screen, alternative user interfaces may be implemented by the wireless device 102. For example, the wireless device 102 may be implemented as a laptop with a user interface including one or more of a mouse, a track pad, a keyboard, a microphone, a monitor, a projector screen, or speakers. In some implementations, the user interface 600 does not include the settings menu 610 for receiving the inputs 612 or 614, but rather, the wireless device 102 enters the mobile relay mode automatically and without receiving user input.

Techniques for Wireless Communication via a Mobile Relay

Figure 7:
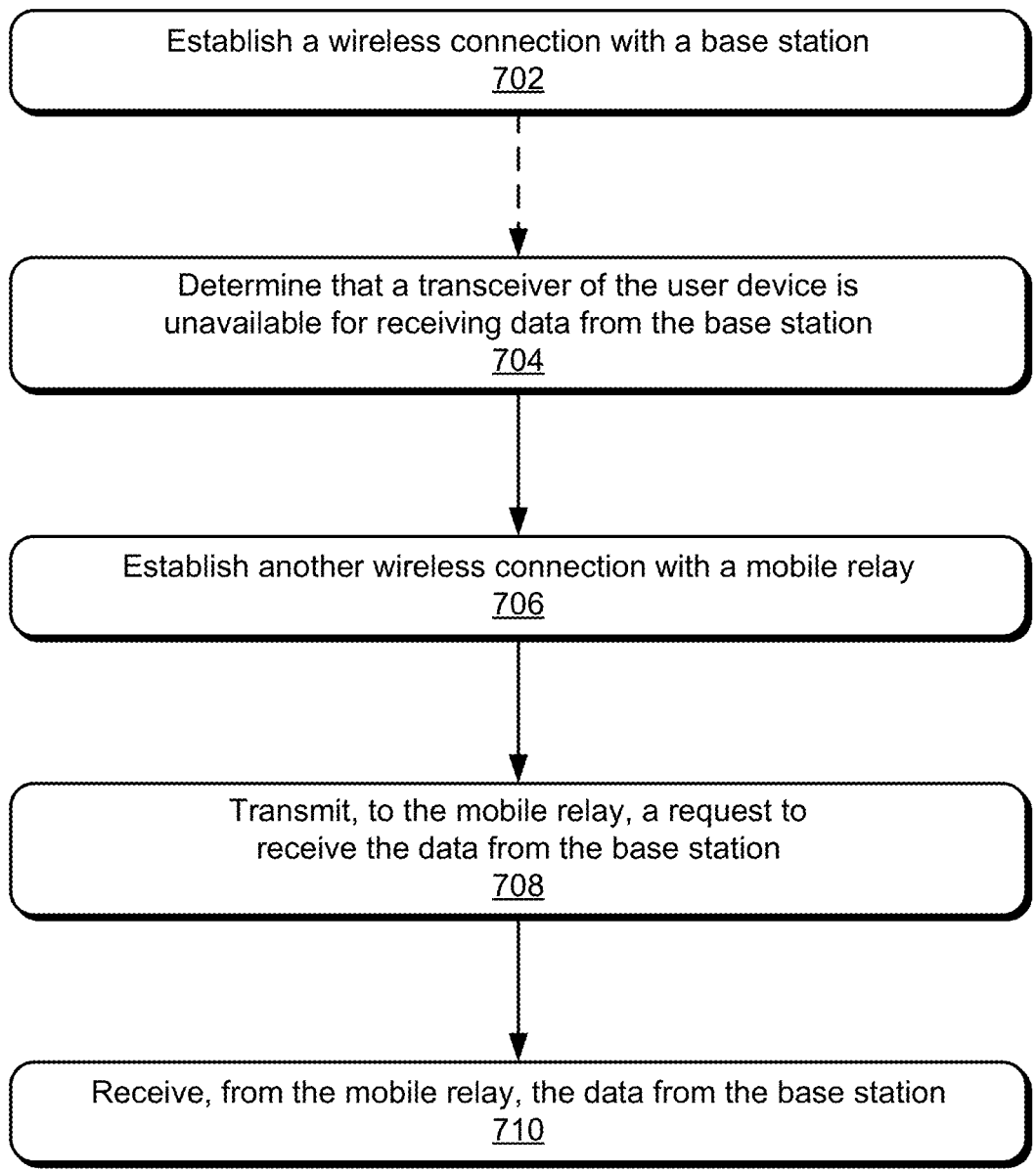
FIG. 7 illustrates an example method performed by the user device for wireless communication via a mobile relay.
Figure 8:
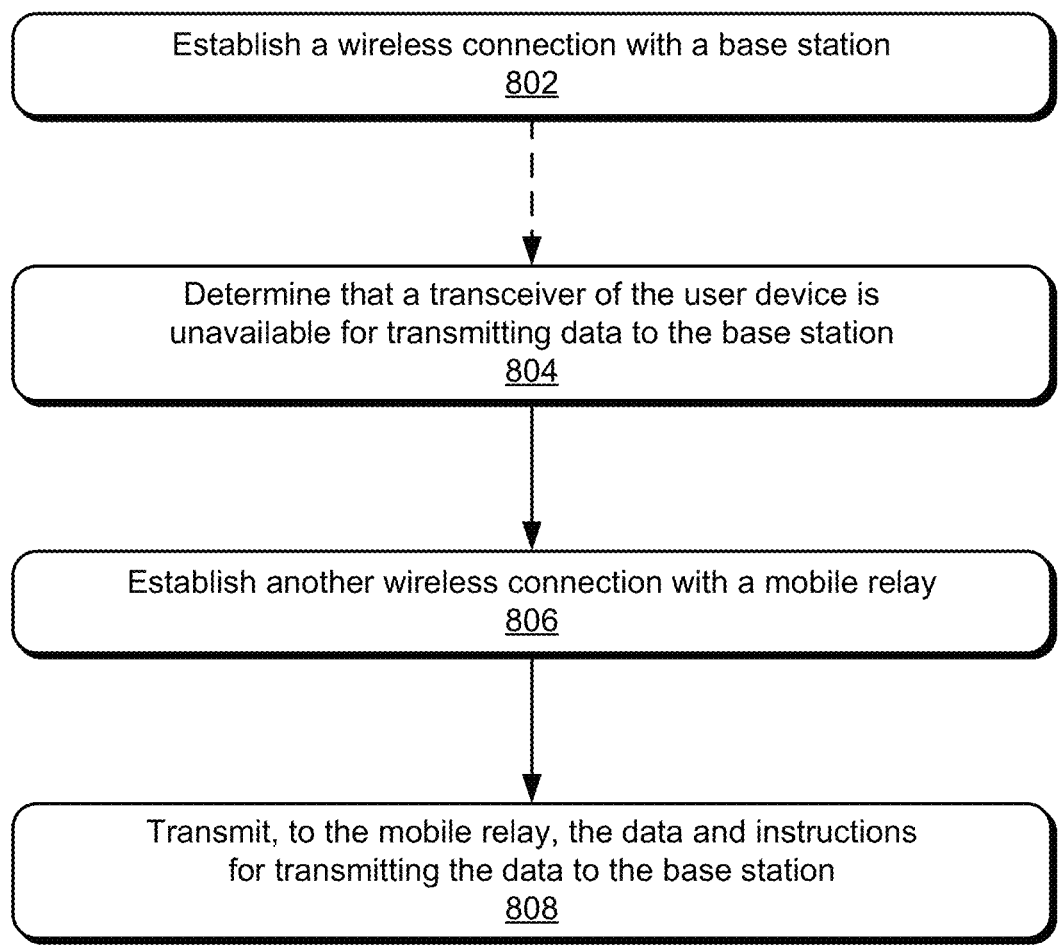
FIG. 8 illustrates another example method performed by the user device for wireless communication via a mobile relay.
Figure 9:
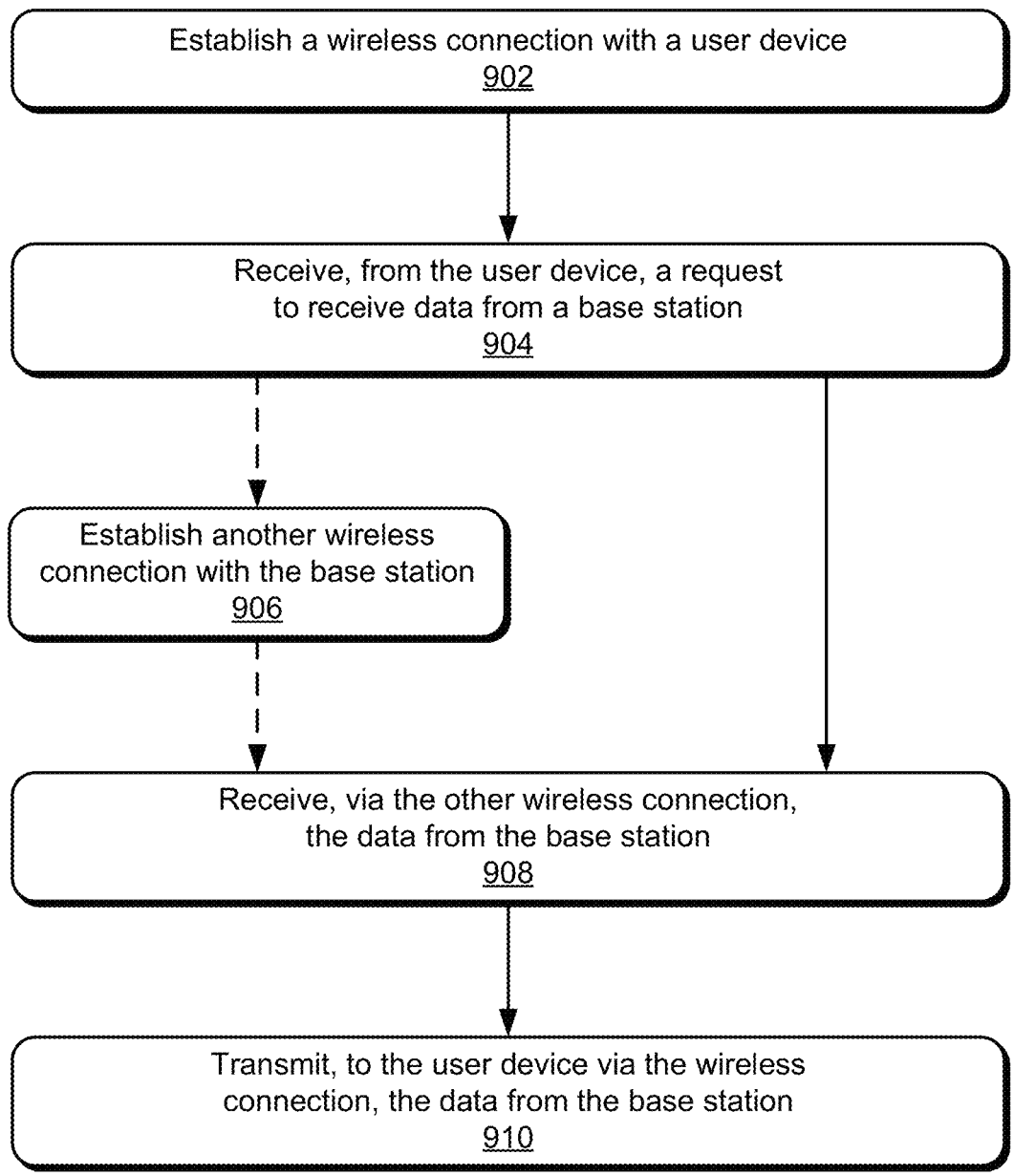
FIG. 9 illustrates another example method performed by the mobile relay for wireless communication via a mobile relay.

FIGS. 7-9 depict methods for implementing wireless communication via a mobile relay. These methods are shown as sets of blocks that specify operations performed but are not necessarily limited to the order or combinations shown for performing the operations by the respective blocks. For example, operations of different methods may be combined, in any order, to implement alternate methods without departing from the concepts described herein. In portions of the following discussion, the techniques may be described in reference to FIGS. 1-6, reference to which is made for example only. The techniques are not limited to performance by one entity or multiple entities operating on one device, or those described in these figures.

FIG. 7 illustrates an example method 700 performed by a user device for wireless communication via a mobile relay. The method 700 includes operations that may be performed by an antenna availability module, such as the transceiver availability module 116, a communication scheduler, such as the communication scheduler 118, and a communication module, such as the communication module 122. In some aspects, operations of the method 700 may allow for the user device to receive data from a base station via a mobile relay when a transceiver of the user device is unavailable.

At optional operation 702, the user device establishes a wireless connection with a base station. For example, the user device 202 establishes the wireless connection 106 with the base station 104. This may be performed via a transceiver of the user device 202 based on a protocol of a radio access technology associated with the wireless connection 106. For example, the user device 202 may request, via a PRACH of the wireless connection 106, access to a wireless network provided by the base station 104. The base station 104 may then transmit a communication schedule via a PDCCH.

At operation 704, the user device determines that the transceiver of the user device is unavailable for receiving data from the base station. For example, the user device 202 determines that a first transceiver is unavailable for receiving the downlink data 216 from the base station 104. As discussed herein, the first transceiver may be unavailable based on, for example, detecting a low signal strength of a wireless connection with the base station 104, being occupied for another transmission or reception, a high temperature of the user device, or a low power level of the user device.

At operation 706, the user device establishes another wireless connection with a mobile relay. For example, the user device 202 establishes another wireless connection with the mobile relay 204 over one of a personal area network or an LTE side-link. The other wireless connection may operate over a frequency bandwidth that is distinct from the wireless connection with the base station 104. Further, the user device 202 may establish the other wireless connection with the mobile relay 204 before, during, or in response to operation 704.

At operation 708, the user device transmits, to the mobile relay via the other wireless connection, a request to receive the data from the base station. For example, the user device 202 transmits the request to receive data 214 to the mobile relay 204 over the other wireless connection.

At operation 710, the user device receives, from the mobile relay, the data from the base station. For example, the user device 202 receives the downlink data 216 from the mobile relay 204, which the mobile relay 204 received from the base station 104. In some implementations, the mobile relay 204 modifies the downlink data 216 received from the base station 104 before transmitting the downlink data 216 to the user device 202.

FIG. 8 illustrates an example method 800 performed by a user device for wireless communication via a mobile relay. The method 800 includes operations that may be performed by an antenna availability module, such as the transceiver availability module 116, a communication scheduler, such as the communication scheduler 118, and a communication module, such as the communication module 122. In some aspects, operations of the method 800 may allow for the user device to transmit data to a base station via a mobile relay when a transceiver of the user device is unavailable.

At optional operation 802, the user device establishes a wireless connection with a base station. For example, the user device 202 establishes the wireless connection 106 with the base station 104. This may be performed via a hardware-based transceiver of the user device 202 based on a protocol of a radio access technology associated with the wireless connection 106. For example, the user device 202 may request, via a PRACH of the wireless connection 106, access to a wireless network provided by the base station 104. The base station 104 may then transmit a communication schedule via a PDCCH.

At operation 804, the user device determines that the hardware-based transceiver of the user device is unavailable for transmitting data from the base station. For example, the user device 202 determines that a first transceiver is unavailable for transmitting the data 404 to the base station 104. As discussed herein, the first transceiver may be unavailable based on, for example, detecting a low signal strength of a wireless connection with the base station 104, being occupied for another transmission or reception, a high temperature of the user device, or a low power level of the user device.

At operation 806, the user device establishes another wireless connection with a mobile relay. For example, the user device 202 establishes another wireless connection with the mobile relay 204 over one of a personal area network or an LTE side-link. The other wireless connection may operate over a frequency bandwidth that is distinct from the wireless connection with the base station 104. Further, the user device 202 may establish the other wireless connection with the mobile relay 204 before, during, or in response to operation 804.

At operation 808, the user device 202 transmits, to the mobile relay via the other wireless connection, the data and instructions for transmitting the data to the base station. For example, the user device 202 transmits the instructions 402 including the data 404 and the transmission instructions 406 to the mobile relay 204 over the other wireless connection.

FIG. 9 illustrates an example method 900 performed by a mobile relay for wireless communication by a user device via the mobile relay. The method 900 includes operations that may be performed by a data modifier, such as the data modifier 120, and a communication module, such as the communication module 122. In some aspects, operations of the method 900 may allow the mobile relay to receive data from a base station and then transmit the data to a user device when a transceiver of the user device is unavailable for direct communication with the base station.

At operation 902, the mobile relay device establishes a wireless connection with a user device. For example, the mobile relay 204 establishes a wireless connection with the user device 202 over one of a personal area network or an LTE side-link. This may be performed via a first transceiver of the mobile relay 204 based on a protocol of a radio access technology associated with the wireless connection with the user device 202.

At operation 904, the mobile relay receives, from the user device, a request to receive data from a base station. The request may include instructions for the mobile relay to receive the data from the base station. For example, the mobile relay 204 receives the request to receive data 214 including instructions 402 identifying resources over which the downlink data 216 is to be transmitted by the base station 104. Additionally or alternatively, the request may include instructions for modifying the data by decoding or partially decoding the data.

At optional operation 906, the mobile relay establishes, via a second transceiver, another wireless connection with the base station. For example, the mobile relay 204 establishes another wireless connection with the base station 104 that is distinct from a wireless connection between the base station 104 and the user device 202. Alternatively, the mobile relay 204 identifies the wireless connection between the base station 104 and the user device 202 to function as an external transceiver of the user device 202. The other wireless connection may operate over a frequency bandwidth that is distinct from the wireless connection with the user device 202. Further, the user device 202 may establish the other wireless connection with the base station 104 before, during, or in response to operation 904.

At operation 908, the mobile relay receives, via the other wireless connection, the data from the base station. For example, the mobile relay 204 receives the downlink data 216 from the base station 104 over the other wireless connection.

At operation 910, the mobile relay transmits, to the user device via the wireless connection, the data from the base station. For example, the mobile relay 204 transmits the downlink data 216 to the user device 202. In some implementations, the mobile relay 204 modifies the downlink data 216 before transmitting the downlink data 216 to the user device 202.

Although techniques using, and apparatuses for implementing, wireless communication via a mobile relay have been described in language specific to features and/or methods, it is to be understood that the subject of the appended claims is not necessarily limited to the specific features or methods described. Rather, the specific features and methods are disclosed as example ways in which wireless communication via a mobile relay can be implemented.

What is claimed is:

1. A method performed by a mobile relay for wireless communication of a user device using the mobile relay, the method comprising:
   establishing, using a first wireless transceiver of the mobile relay, a first wireless connection with the user device;
   receiving, from the user device, a request to receive data from a base station, the request including instructions for the mobile relay to receive the data, the instructions comprising:
      a direction to receive the data over scheduled downlink communication resources that are allocated for reception of the data over a downlink of a third wireless connection between the user device and the base station; or
      a direction to request downlink communication resources from the base station for reception of the data;
   establishing, using a second wireless transceiver of the mobile relay, a second wireless connection with the base station;
   receiving, using the second wireless connection, the data from the base station over the scheduled downlink communication resources or granted downlink communication resources that have been granted to the mobile relay responsive to sending the request for downlink communication resources; and
   transmitting, to the user device using the first wireless connection, the data from the base station.

2. The method as recited in claim 1, wherein the receiving the data from the base station comprises:
   configuring the second wireless transceiver to receive a downlink communication of the data from the base station; and
   processing the received downlink communication before transmitting the data to the user device.

3. The method as recited in claim 2, wherein the processing the received downlink communication includes down-converting the received downlink communication from a frequency band at which the second wireless connection operates to another frequency band at which the first wireless connection operates.

4. The method as recited in claim 2, wherein the processing the received downlink communication includes decoding the received downlink communication before transmitting the data to the user device using the first wireless connection.

5. The method as recited in claim 2, wherein:
   the processing the received downlink communication includes sampling in-phase and quadrature components of the received downlink communication from the base station; and
   the transmitting the data to the user device includes transmitting the samples of the in-phase and quadrature components of the received downlink communication.

6. The method as recited in claim 1, wherein the request further includes at least one of:
   a spatial layer over which the data is scheduled to be received; or
   decoding instructions.

7. The method as recited in claim 1, wherein the first wireless connection with the user device operates according to a device-to-device protocol.

8. The method as recited in claim 7, wherein the device-to-device protocol includes one or more of a personal area network protocol or a side-link protocol.

9. The method as recited in claim 1, wherein:
   the instructions comprise the direction to receive the data over the scheduled downlink communication resources that are allocated for the reception of the data over the downlink of the third wireless connection between the user device and the base station; and
   the receiving the data from the base station comprises receiving the data over the scheduled downlink communication resources.

10. The method as recited in claim 1:
   wherein the instructions comprise the direction to request the downlink resources from the base station for reception of the data;
   further comprising:
      requesting the downlink communication resources from the base station for reception of the data; and
      receiving a resource grant from the base station granting the granted downlink communication resources; and
   wherein the receiving the data from the base station comprises receiving the data over the granted downlink communication resources.

11. A mobile relay comprising:
   a processor;
   a first wireless transceiver and a second wireless transceiver; and
   a computer-readable storage medium having stored instructions that, responsive to execution by the processor, cause the processor to:
      establish, using the first wireless transceiver of the mobile relay, a first wireless connection with a user device;
      receive, from the user device, instructions to transmit data to a base station, the instructions including data to transmit to the base station and:
         a direction to transmit the data over scheduled uplink communication resources that are allocated for transmission of the data over an uplink of a third wireless connection between the user device and the base station; or
         a direction to request uplink communication resources from the base station for transmission of the data;
      establish, using the second wireless transceiver of the mobile relay, a second wireless connection with the base station; and
      transmit the data to the base station using the second wireless connection over the scheduled uplink communication resources or granted uplink communication resources that have been granted to the mobile relay responsive to sending the request for uplink communication resources.

12. The mobile relay as recited in claim 11, wherein:
   the processor establishes the first wireless connection over a first frequency band;

the processor establishes the second wireless connection over a second frequency band; and the first frequency band is distinct from the second frequency band.

13. The mobile relay as recited in claim 11, wherein the instructions further include:

spatial layers of the scheduled communication resources.

14. The mobile relay as recited in claim 11, wherein the instructions further cause the processor to, when transmitting the data to the base station, identify one of the mobile relay or the user device as a source of the data.

15. The mobile relay as recited in claim 11, wherein the stored instructions further cause the processor to:

receive, from the user device, the direction to transmit the data over the scheduled uplink communication resources that are allocated for the transmission of the data over the uplink of the third wireless connection between the user device and the base station; and transmit the data to the base station over the scheduled uplink communication resources.

16. The mobile relay as recited in claim 11, wherein the stored instructions further cause the processor to:

receive, from the user device, the direction to request the uplink communication resources from the base station for transmission of the data;

request the uplink communication resources from the base station for transmission of the data;

receive a resource grant from the base station granting the granted uplink communication resources; and transmit the data to the base station over the granted uplink communication resources.

17. The mobile relay as recited in claim 11, wherein the instructions further include:

instructions for identifying the user device as a source of the data.

18. A system for wireless communication using a mobile relay, the system including:

a base station configured to control parameters of an uplink transmission or a downlink transmission in accordance with one or more wireless protocols;

a user device configured to:

establish a first wireless connection with the base station; and establish a second wireless connection with the mobile relay when a wireless transceiver of the user device is unavailable for receiving data from the base station or for transmitting data to the base station; and the mobile relay configured to relay communications between the user device and the base station by using:

a first wireless transceiver to communicate with the user device over the second wireless connection; and a second wireless transceiver to communicate with the base station over a third wireless connection based on instructions, received from the user device over the second wireless connection, to receive the data from the base station or to transmit the data to the base station.

19. The system as recited in claim 18, wherein:

the second wireless connection is established over a first frequency band;

the third wireless connection is established over a second frequency band; and the first frequency band is distinct from the second frequency band.

20. The system as recited in claim 18, wherein the instructions from the user device include at least one of:

an identification of scheduled communication resources that are allocated for transmission or receipt of the data over the first wireless connection between the user device and the base station;

spatial layers of the scheduled communication resources; or instructions for identifying the user device as a source or destination of the data.

21. The system as recited in claim 18, wherein the instructions direct the mobile relay to transmit or receive the data over the scheduled communication resources of the first wireless connection.

22. The system as recited in claim 18, wherein the mobile relay is configured to:

when receiving the data from the base station to transmit to the user device, receive a downlink communication of the data and process the received downlink communication before transmitting the data to the user device; or when receiving the data from the user device to transmit to the base station, convert the data into another format before transmitting the data to the base station according to a protocol of the third wireless connection.

* * * * *